United States Patent
Tao et al.

(10) Patent No.: US 11,275,282 B2
(45) Date of Patent: Mar. 15, 2022

(54) LIQUID CRYSTAL DISPLAY PANEL AND DISPLAY DEVICE

(71) Applicant: WUHAN CHINA STAR OPTOELECTRONICS TECHNOLOGY CO., LTD., Hubei (CN)

(72) Inventors: Jian Tao, Hubei (CN); Yafeng Li, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 125 days.

(21) Appl. No.: 16/764,419

(22) PCT Filed: Jan. 9, 2020

(86) PCT No.: PCT/CN2020/071074
§ 371 (c)(1),
(2) Date: May 15, 2020

(87) PCT Pub. No.: WO2021/120352
PCT Pub. Date: Jun. 24, 2021

(65) Prior Publication Data
US 2021/0405480 A1    Dec. 30, 2021

(30) Foreign Application Priority Data

Dec. 16, 2019  (CN) .......................... 201911295328.X

(51) Int. Cl.
*G02F 1/1362* (2006.01)
*G02F 1/1335* (2006.01)
*G02F 1/1343* (2006.01)
*G09G 3/36* (2006.01)
*G02F 1/133* (2006.01)
*G02F 1/1333* (2006.01)
*G09G 3/00* (2006.01)
*G02F 1/1345* (2006.01)

(52) U.S. Cl.
CPC .... *G02F 1/136254* (2021.01); *G02F 1/13306* (2013.01); *G02F 1/13439* (2013.01); *G02F 1/13454* (2013.01); *G02F 1/133357* (2021.01); *G02F 1/133514* (2013.01); *G02F 1/136286* (2013.01); *G09G 3/006* (2013.01); *G09G 3/3677* (2013.01)

(58) Field of Classification Search
CPC ................................................ G02F 1/136254
See application file for complete search history.

(56) References Cited

U.S. PATENT DOCUMENTS

2016/0140896 A1* 5/2016 Kwon ................... G09G 3/3225
                                                                345/76
2020/0133054 A1* 4/2020 Oshige .............. G02F 1/133514

\* cited by examiner

Primary Examiner — Edmond C Lau

(57) ABSTRACT

The present application provides a liquid crystal display panel and a display device. Invalid pixels of the liquid crystal display panel include a test pixel. In this structure, when no tests are required, the test pixel is in an off state, and there is no voltage difference between a pixel electrode and a common electrode to cause rotation of liquid crystals. When a test is required, the test pixel is in an on state, and the pixel electrode is disconnected from the common electrode to cause a voltage difference, so that the liquid crystals are normally rotated.

20 Claims, 7 Drawing Sheets

LIQUID CRYSTAL DISPLAY PANEL AND DISPLAY DEVICE

FIELD OF DISCLOSURE

The present invention relates to a field of display technology and in particular, to a liquid crystal display panel and a display device.

DESCRIPTION OF RELATED ART

With rapid development of the display panel industry, the industry has almost reached a limit on designing liquid crystal displays. Therefore, to understand how much room is left for making the design, it is necessary to accurately measure key parameters of the product and also compare the key parameters with those in simulations, so that optimal values can be obtained for product design.

At present, there are two difficulties in monitoring pixel voltage in a display region. First, if a test point is designed in the display region, normal display of an LCD panel is affected to cause abnormal display. Second, a capacitance behind a pixel electrode and a common electrode is relatively small, generally below 1 pF. Therefore, when the test point is externally connected, the pixel voltage is likely to be released in the air, causing measurement failures.

SUMMARY

The present application provides a liquid crystal display panel and a display device to improve accuracy of pixel voltage measurement in a display region of the liquid crystal display panel.

Accordingly, the present application provides a technical solution as follows.

The present application provides a liquid crystal display panel, comprising an array substrate and a color filter substrate disposed corresponding to each other, the array substrate comprising:

a plurality of invalid pixels arranged in an array;

an invalid gate driving unit disposed corresponding to the invalid pixels;

a disable signal terminal for outputting a voltage signal of a disable switch transistor; and a common voltage terminal for outputting a common voltage;

wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;

wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

In the liquid crystal display panel according to one embodiment of the present application, the array substrate comprises:

a substrate;

a buffer layer formed on the substrate;

a first metal layer formed on the buffer layer, wherein the first metal layer is patterned to form the gate of the test switch transistor;

an interlayer insulating layer formed on the first metal layer;

a second metal layer formed on the interlayer insulating layer;

a planarization layer formed on the second metal layer;

a first transparent conductive layer formed on the planarization layer, wherein the first transparent conductive layer is patterned to form an array substrate common electrode and the test terminal, and the test terminal is electrically insulated from the array substrate common electrode;

a passivation layer formed on the first transparent conductive layer; and a second transparent conductive layer formed on the passivation layer, wherein the second transparent conductive layer is patterned to form the pixel electrode.

In the liquid crystal display panel according to one embodiment of the present application, the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

In the liquid crystal display panel according to one embodiment of the present application, the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

According to one embodiment of the present application, the liquid crystal display panel comprises more than one second connection line.

In the liquid crystal display panel according to one embodiment of the present application, the second metal layer common voltage pattern is connected to the array substrate common electrode through a via hole, and the array substrate common electrode is connected to the common voltage terminal.

In the liquid crystal display panel according to one embodiment of the present application, the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

In the liquid crystal display panel according to one embodiment of the present application, the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is also patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

In the liquid crystal display panel according to one embodiment of the present application, the first metal layer test pattern is directly connected to the test terminal through a via hole, or the first metal layer test pattern is connected to the second metal layer test pattern through a via hole.

In the liquid crystal display panel according to one embodiment of the present application, the first transparent conductive layer is made of conductive glass.

The present application further provides a display device, and the display device comprises a liquid crystal display panel and an external driving chip bound to the liquid crystal display panel, wherein the liquid crystal display panel comprises an array substrate and a color filter substrate disposed corresponding to each other, and the array substrate comprises:

a plurality of invalid pixels arranged in an array;

an invalid gate driving unit disposed corresponding to the invalid pixels;

a disable signal terminal for outputting a voltage signal of a disable switch transistor; and a common voltage terminal for outputting a common voltage;

wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;

wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

In the display device according to one embodiment of the present application, the array substrate comprises:

a substrate;

a buffer layer formed on the substrate;

a first metal layer formed on the buffer layer, wherein the first metal layer is patterned to form the gate of the test switch transistor;

an interlayer insulating layer formed on the first metal layer;

a second metal layer formed on the interlayer insulating layer;

a planarization layer formed on the second metal layer;

a first transparent conductive layer formed on the planarization layer, wherein the first transparent conductive layer is patterned to form an array substrate common electrode and the test terminal, and the test terminal is electrically insulated from the array substrate common electrode;

a passivation layer formed on the first transparent conductive layer; and a second transparent conductive layer formed on the passivation layer, wherein the second transparent conductive layer is patterned to form the pixel electrode.

In the display device according to one embodiment of the present application, the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

In the display device according to one embodiment of the present application, the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

According to one embodiment of the present application, the display device comprises more than one second connection line.

In the display device according to one embodiment of the present application, the second metal layer common voltage pattern is connected to the array substrate common electrode through a via hole, and the array substrate common electrode is connected to the common voltage terminal.

In the display device according to one embodiment of the present application, the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

In the display device according to one embodiment of the present application, the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

In the display device according to one embodiment of the present application, the first metal layer test pattern is directly connected to the test terminal through a via hole, or the first metal layer test pattern is connected to the second metal layer test pattern through a via hole.

In the display device according to one embodiment of the present application, the first transparent conductive layer is made of conductive glass.

Advantages of the Present Application:

The present application provides a liquid crystal display panel and a display device. The liquid crystal display panel comprises an array substrate and a color filter substrate disposed corresponding to each other, wherein the array substrate comprises:

a plurality of invalid pixels arranged in an array;

an invalid gate driving unit disposed corresponding to the invalid pixels;

a disable signal terminal for outputting a voltage signal of a disable switch transistor; and a common voltage terminal for outputting a common voltage;

wherein the invalid pixels comprise a test pixel, the test pixel comprises a driving circuit and a test terminal disposed in a shielding region and comprises a pixel electrode in a light-transmissive region, the driving circuit comprises a test switch transistor, the test terminal is connected to the pixel electrode to be a pixel voltage test point;

wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

Based on this structure, the test pixel is an invalid pixel, and when the pixel voltage test is not needed, the test pixel is in an off state, and there is no voltage difference between the pixel electrode and the common electrode to cause rotation of liquid crystals, so normal display functions of the liquid crystal display panel are not affected. Furthermore, when the pixel voltage test is needed, the test pixel is in an on state, and the pixel electrode is disconnected from the common electrode to cause a voltage difference, so that the liquid crystals are normally rotated. In addition, the test terminal is arranged in the shielding region for the test pixel, so the pixel voltage is not released to the air, which improves accuracy of pixel voltage measurement in the display region of the liquid crystal display panel.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

The present application provides a liquid crystal display panel and a display device. In order to make clear the purpose, technical solution, and functions of the present application, the present application is further described in detail below with reference to the accompanying drawings and examples. It should be understood that the specific embodiments described herein are only used to explain the application, and are not used to limit the present application.

The directional terms mentioned in the present application, such as "up", "down", "left", "right", "front", "rear", "inside", "outside", and "lateral", are for illustrative purposes with reference to the accompanying drawings. Therefore, the directional terms are used to explain and understand the present application, but not to limit the present application. The terms "first", "second", etc. are used for illustrative purposes only, and cannot be understood as indicating or implying their relative importance or implicitly indicating the number of technical features indicated. Thus, features defined as "first", "second", and etc. may explicitly or implicitly include one or more of the features.

The following disclosure provides many different examples for implementing different structures of the present application. To simplify the present disclosure, the components and configurations of specific examples are described below. Of course, they are merely examples and are not intended to limit the present application. In addition, the present application may repeat reference numbers and/or reference letters in different examples, and such repetition is for the purpose of simplicity and clarity, and does not itself indicate the relationship between the various embodiments and/or configurations discussed. In addition, the present application provides examples of various specific processes and materials, but those of ordinary skill in the art may be aware of other processes and/or the use of other materials.

The present application provides a liquid crystal display panel and a display device to improve the accuracy of pixel voltage measurement in a display region of the liquid crystal display panel.

Figure 1:
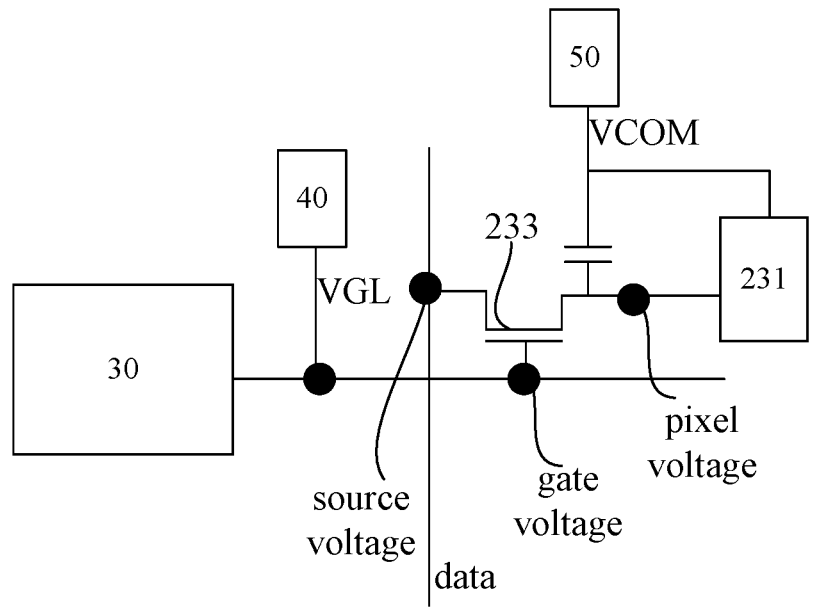
FIG. 1 is a schematic connection diagram illustrating that a test pixel is in an off state according to one embodiment of the present application.
Figure 2:
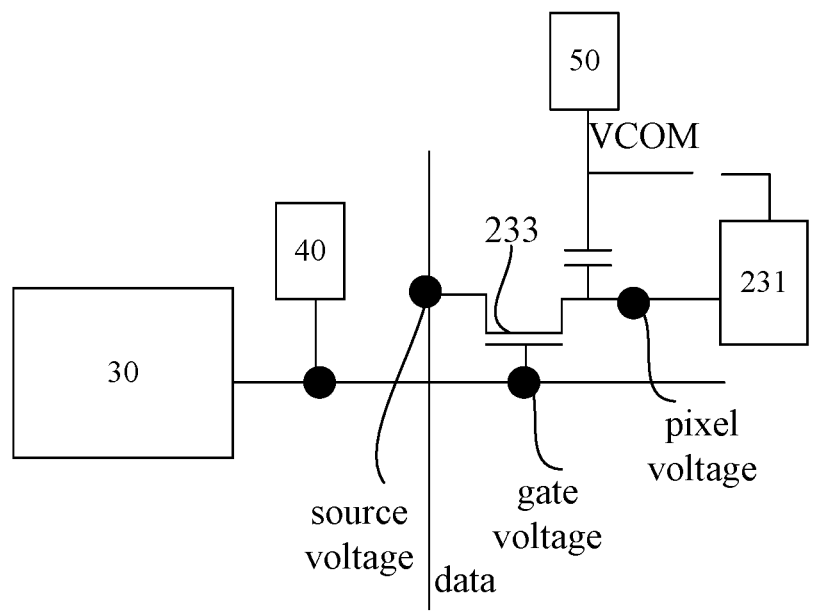
FIG. 2 is a schematic diagram illustrating that the test pixel is in an on state according to one embodiment of the present application.
Figure 11:
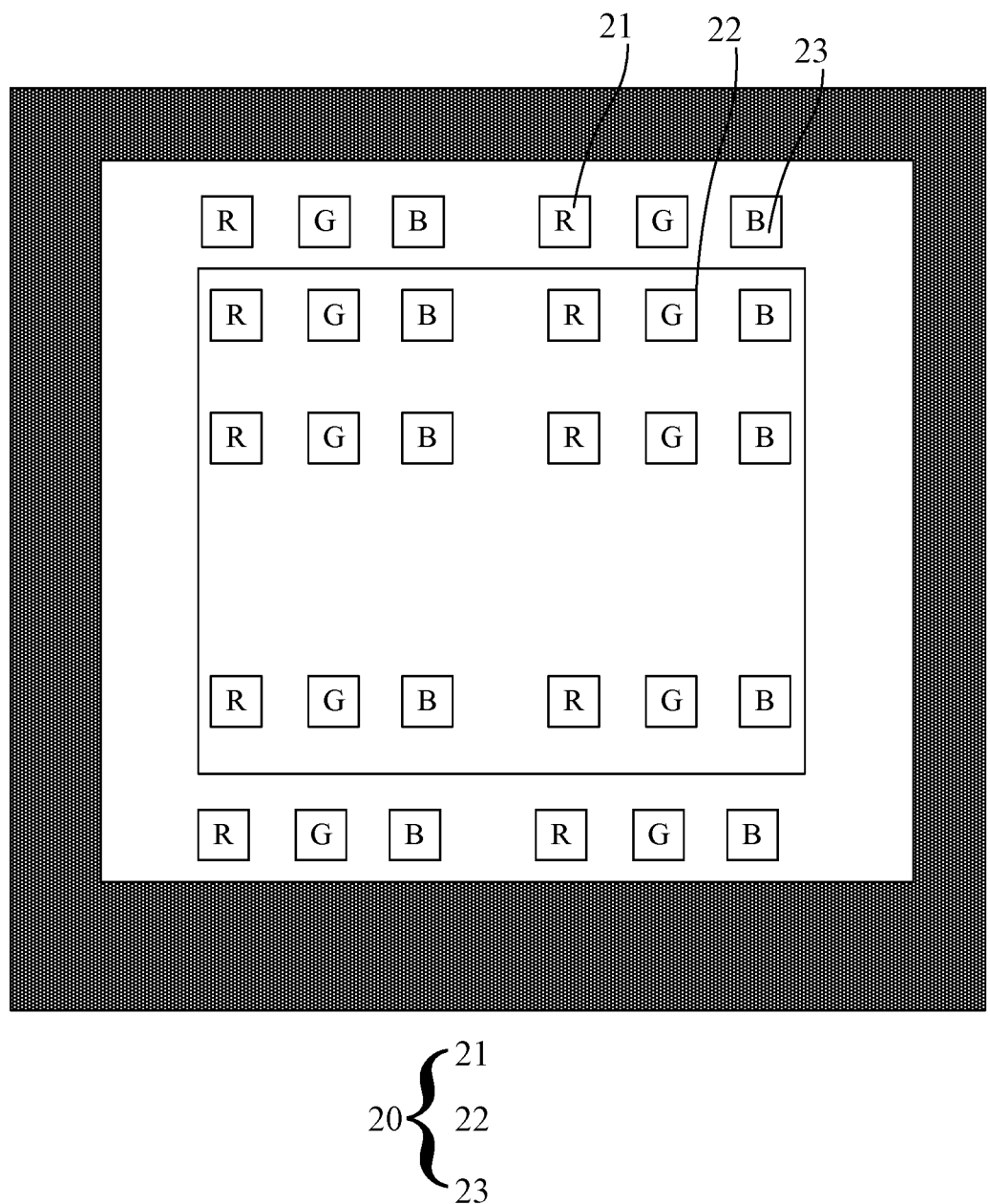
FIG. 11 is a schematic diagram illustrating pixel distribution of the liquid crystal display panel according to one embodiment of the present application.

As shown in FIGS. 1 to 11, according to one embodiment, the present application provides a liquid crystal display panel 10, comprising an array substrate 11 and a color filter substrate 12, the array substrate 11 comprising:

a plurality of invalid pixels 21 arranged in an array, wherein as shown in FIG. 11, pixels 20 of the array substrate 11 include the invalid pixels 21 arranged in rows and effective pixels 22 arranged in an array, the effective pixels 22 are arranged in a display region, and the invalid pixels 21 are disposed in the display region and a sealant frame region;

an invalid gate driving unit 30 disposed corresponding to the invalid pixels 21;

a disable signal terminal 40 for outputting a voltage signal of a disable switch transistor; and a common voltage terminal 50 for outputting a common voltage;

wherein the invalid pixels 21 comprise a test pixel 23, the test pixel 23 comprises a driving circuit and a test terminal 231 disposed in a shielding region and comprises a pixel electrode 232 in a light-transmissive region, the driving circuit comprises a test switch transistor 233, the test terminal 231 is connected to the pixel electrode 232 to be used as a pixel voltage test point;

wherein a gate of the test switch transistor 233 is connected to a signal output terminal of the invalid gate driving unit 30 and the disable signal terminal 40, and the test terminal 231 is connected to the common voltage terminal 50; as shown in FIG. 1, when a pixel voltage needs not be tested, the invalid gate driving unit 30 outputs no switching signals; as shown in FIG. 2, when the pixel voltage needs to be tested, the gate of the test switch transistor 233 is disconnected from the disable signal terminal 40, the test terminal 231 is disconnected from the common voltage terminal 50, and the invalid gate driving unit 30 outputs a switching signal to switch on the test pixel.

Specifically, in a non-test stage, as shown in FIG. 1, an output line of the invalid gate driving unit 30 is connected to the disable signal terminal 40, the pixel electrode 232 is connected to one test terminal 231, and the test terminal 231 is connected to the common voltage terminal 50. This way, in a normal display stage, the invalid gate driving unit 30 is in an off state and has no effect on display functions of the display region. A gate voltage of the test switch transistor 233 is VGL, the test switch transistor 233 is turned off, and the pixel electrode 232 is connected to a potential (i.e., VCOM) of the common voltage terminal 50, so there is no voltage difference between the pixel electrode 232 and VCOM. In other words, there is no electric field, so liquid crystals there are not driven to cause light leakage. In a test stage, as shown in FIG. 2, a connection line between the gate of the test switch transistor 233 and the disable signal terminal 40 and a connection line between the pixel electrode and a VCOM signal are disconnected by laser. This way, a gate signal of the test switch transistor 233 is output, and the gate voltage changes according to a voltage of a data line data. The pixel electrode is charged to generate a pixel voltage when the data line data outputs signals. Finally, a corner of the liquid crystal display panel is disassembled by using pliers and the like, and the voltage of the test terminal 231 is measured by a measuring probe to obtain the pixel voltage, and the pixel voltage measurement is completed.

In the present disclosure, the pixels which are not specifically referred to in the embodiments all indicate sub-pixels.

In the structure provided by the present embodiment, the test pixel is an invalid pixel. When the test is not needed, the test pixel is in an off state, and there is no voltage difference between the pixel electrode and a common electrode, so liquid crystals are not rotated, and thus normal display functions of the liquid crystal display panel are not affected. When the test is needed, the test pixel is in an on state, and the pixel electrode is disconnected from the common electrode to cause a voltage difference, so that the liquid crystals are rotated normally. Moreover, the test terminal is set in the shielding region for the test pixel, so the pixel voltage is not released into the air, which improves the accuracy of pixel voltage measurement in the display region of the liquid crystal display panel.

In one embodiment, the liquid crystal display panel may be a vertical alignment liquid crystal display panel or a horizontal alignment liquid crystal display panel. In the vertical alignment liquid crystal display panel, a vertical electric field for controlling rotation of the liquid crystals is generated between the pixel electrode on the array substrate and the common electrode on the color filter substrate. In the horizontal alignment liquid crystal display panel, a horizontal electric field for controlling rotation of the liquid crystals is generated between the pixel electrode on the array substrate and the common electrode.

In one embodiment, a color filter layer (that is, a red color resist layer, a green color resist layer, and a blue color resist layer) can be formed only on the color filter substrate, and the liquid crystal display panel has a conventional structure. Alternatively, the color filter layer can be formed only on the array substrate, and the liquid crystal display panel has a COA structure. In another example, the color filter layer can be formed on the color filter substrate and the array substrate at the same time, and the liquid crystal display panel has wider color gamut.

In one embodiment, the pixels of the display region are arranged in a manner that red sub-pixels, green sub-pixels, and blue sub-pixels are arranged in order or present repeated sub-pixel arrangements.

In one embodiment, the driving circuit of the sub-pixel can comprise only one transistor, or have a structure with a transistor and a storage capacitor, such as a 3T1C, 7T1C, or 8T2C pixel structure.

The present application is further described by taking an example that the liquid crystal display panel is a horizontal alignment liquid crystal display panel and the driving circuit includes only one transistor.

According to one embodiment of the present invention, the array substrate comprises:

a substrate;

a buffer layer formed on the substrate;

a first metal layer formed on the buffer layer, wherein the first metal layer is patterned to form the gate of the test switch transistor;

an interlayer insulating layer formed on the first metal layer;

a second metal layer formed on the interlayer insulating layer;

a planarization layer formed on the second metal layer;

a first transparent conductive layer formed on the planarization layer, wherein the first transparent conductive layer is patterned to form an array substrate common electrode and the test terminal, and the test terminal is electrically insulated from the array substrate common electrode;

a passivation layer formed on the first transparent conductive layer; and a second transparent conductive layer formed on the passivation layer, wherein the second transparent conductive layer is patterned to form the pixel electrode.

According to one embodiment of the present application, the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

According to one embodiment of the present application, the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

According to one embodiment of the present application, the liquid crystal display panel comprises more than one second connection line.

According to one embodiment of the present application, the second metal layer common voltage pattern is connected to the array substrate common electrode through a via hole, and the array substrate common electrode is connected to the common voltage terminal.

According to one embodiment of the present application, the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

According to one embodiment of the present application, the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is also patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

According to one embodiment of the present application, the first metal layer test pattern is directly connected to the test terminal through a via hole, or the first metal layer test pattern is connected to the second metal layer test pattern through a via hole.

Referring to FIGS. 3 to 6, according to one embodiment of the present invention, the array substrate 11 comprises:

a substrate 101, wherein the substrate 101 can be a rigid substrate such as a glass substrate or a transparent resin substrate; the substrate 101 can also be a flexible substrate made of, for example, polyimide, polycarbonate, polyethersulfone, polyethylene terephthalate, polyethylene naphthalate, polyarylate, or glass fiber reinforced plastic; and the flexible substrate is first formed on a glass substrate by coating, and after production of the display panel is completed, the glass substrate is peeled off by laser or other suitable method;

a buffer layer 102 formed on the substrate 101, wherein the buffer layer 102 can be made of an inorganic material such as silicon oxide or silicon nitride;

an active layer 103 formed on the buffer layer 102, wherein the active layer 103 is a metal oxide, such as indium gallium zinc oxide (IGZO), but the present application is not limited in this regard; the active layer 103 can also be made of one or more of aluminum zinc oxide (AZO), indium zinc oxide (IZO), zinc oxide (ZnO), indium oxide (In2O3), boron-doped zinc oxide (BZO), and magnesium-doped zinc oxide (MZO); and besides, the active layer 102 can also be made of polysilicon or other material;

a gate insulating layer 104 formed on the active layer 103, wherein the gate insulating layer 104 can be made of an inorganic material such as silicon oxide or silicon nitride;

a first metal layer 105 formed on the gate insulating layer 104, wherein the first metal layer 105 can be made of molybdenum, aluminum, or copper, but the present application is not limited in this regard; the first metal layer 105 can also be made of chromium, tungsten, titanium, tantalum, or alloy thereof, but the present application is not limited to particular materials herein;

an interlayer insulating layer 106 formed on the first metal layer 105, wherein the interlayer insulating layer 106 can be made of an inorganic material such as silicon oxide or silicon nitride;

a second metal layer 107 formed on the interlayer insulating layer 106, wherein the second metal layer 107 can be made of molybdenum, aluminum, or copper, but the present application is not limited in this regard; the second metal layer 107 can also be made of chromium, tungsten, titanium, tantalum, and alloy thereof, but the present application is not limited to particular materials herein;

a planarization layer 108 formed on the second metal layer 107, wherein the planarization layer 108 is made of a photoresist material, and the planarization layer 108 is formed on the second metal layer 107 by coating;

a first transparent conductive layer 109 formed on the planarization layer 108, wherein the first transparent conductive layer 109 can be made of conductive glass (ITO);

a passivation layer 110 formed on the first transparent conductive layer 109, wherein the passivation layer 110 can be made of at least one of silicon oxide and silicon nitride; and a second transparent conductive layer 111 formed on the passivation layer 110, wherein the second transparent conductive layer 111 can be made of conductive glass (ITO).

The first metal layer 105 is patterned to form a gate a, a gate scan line b, a first connection line c, a first metal layer conversion pattern d, a first metal layer test pattern e, and a fourth connection line f. The second metal layer 107 is patterned to form a data line data, a source g, a drain h, a second metal layer test pattern i, a second metal layer common voltage pattern j, a second connection line k, a third connection line l, and a second metal layer conversion pattern m. The first transparent conductive layer 109 is patterned to form the test terminal 231 and an array substrate common electrode n. The second transparent conductive layer 111 is patterned to form the pixel electrode 232.

Figure 3:
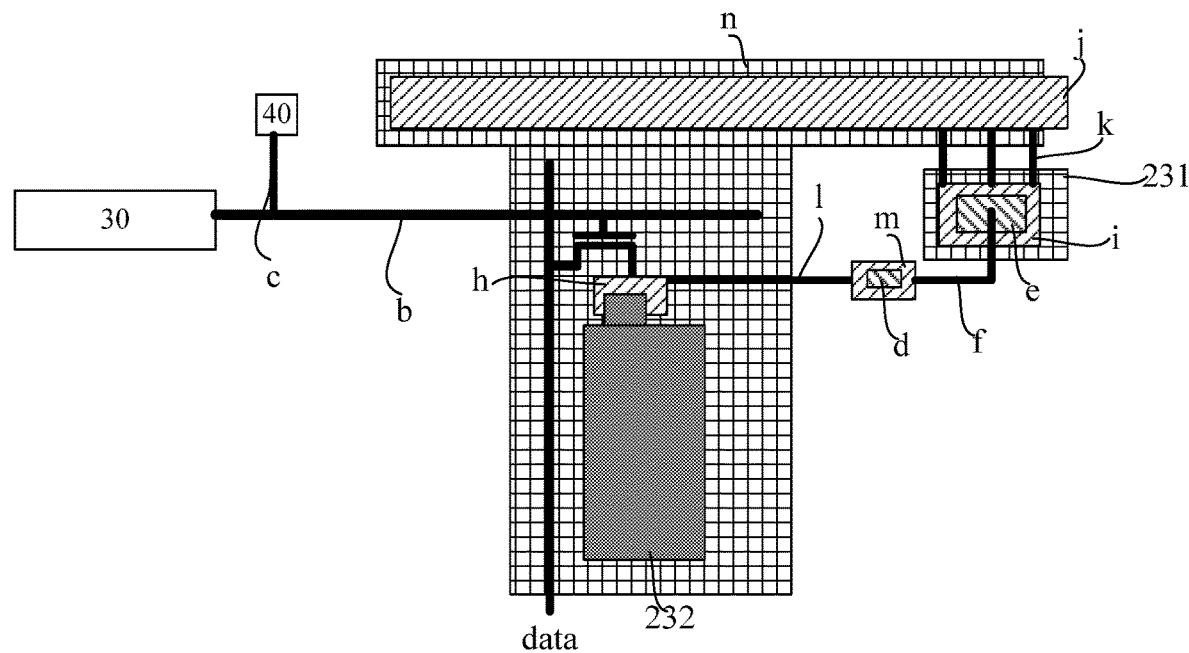
FIG. 3 is a schematic view illustrating that the test pixel is in the off state according to one embodiment of the present application.
Figure 4:
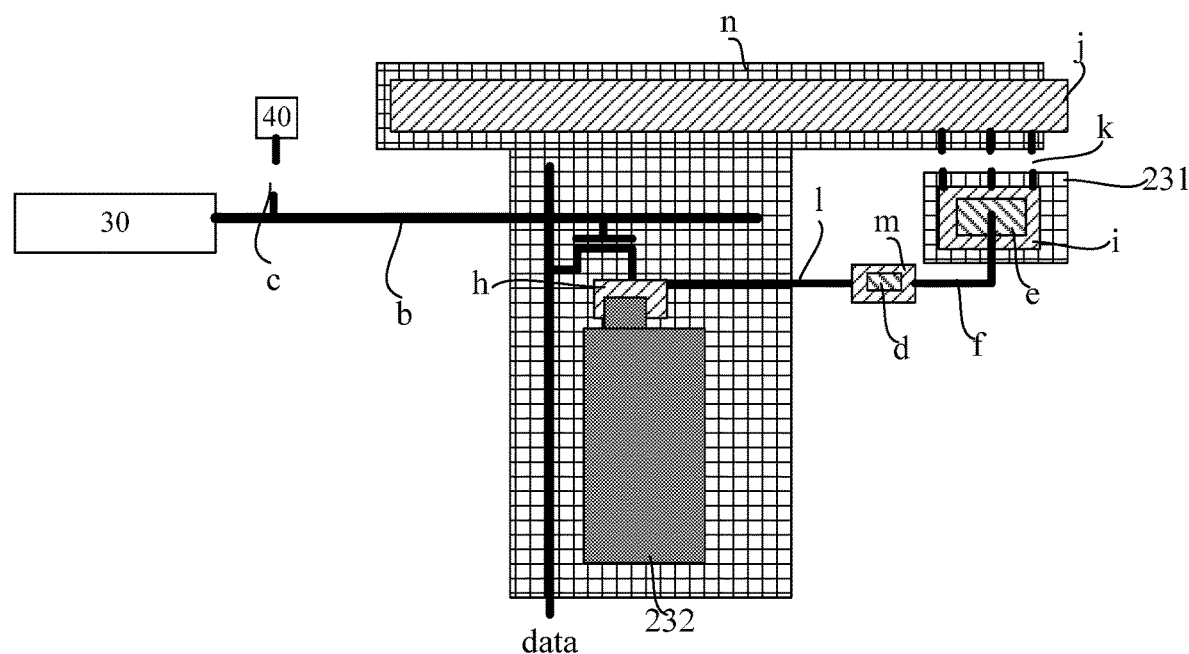
FIG. 4 is a schematic view illustrating that the test pixel is in the on state according to one embodiment of the present application.
Figure 5:
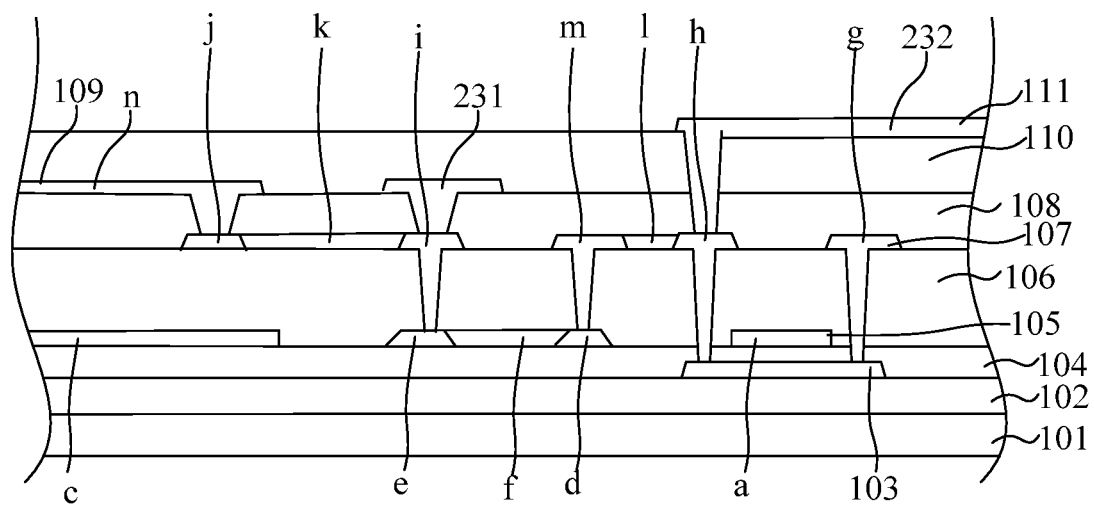
FIG. 5 is a schematic view illustrating film layers of a liquid crystal display panel according to one embodiment of the present application.
Figure 6:
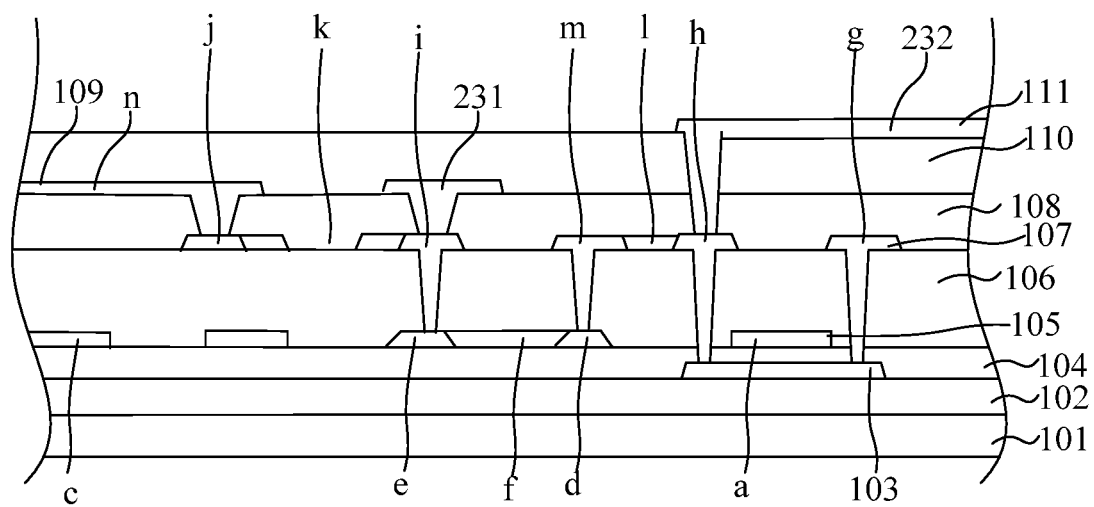
FIG. 6 is a schematic view illustrating the film layers of the liquid crystal display panel according to another embodiment of the present application.

As shown in FIGS. 3 and 5, when the pixel voltage needs not be tested, the first connection line c and the second connection line k remain connected. At this time, the transistor 233 is in an off state, and the pixel electrode 232, the test terminal 231 and the array substrate common electrode n are kept connected, so there is no voltage difference between the pixel electrode 232 and the array substrate common electrode n. As shown in FIGS. 4 and 6, during the pixel voltage measurement, the first connection line c and the second connection line k are both cut off by laser or the like. At this time, the transistor 233 is in an on state, the pixel electrode 232 and the test terminal 231 are kept connected to each other, the pixel electrode 232 is charged, and the pixel voltage can be measured through the test terminal 231.

The present application is further described below by taking an example that the liquid crystal display panel is a vertical alignment liquid crystal display panel and the driving circuit comprises only one transistor.

According to one embodiment, the array substrate comprises:
a substrate;
a buffer layer formed on the substrate;
a first metal layer formed on the buffer layer, wherein the first metal layer is patterned to form the gate of the test switch transistor;
an interlayer insulating layer formed on the first metal layer;
a second metal layer formed on the interlayer insulating layer;
a passivation layer formed on the second metal layer; and
a second transparent conductive layer formed on the passivation layer, wherein the second transparent conductive layer is patterned to form the pixel electrode.

In one embodiment, the first metal layer is further patterned to form a gate scan line and a first connection line, and the gate of the test switch transistor is connected to a signal output terminal of the invalid gate driving unit through the gate scan line. The gate of the test switch transistor is connected to the disable signal terminal through the first connection line, and when the pixel voltage needs to be tested, the first connection line is cut off.

In one embodiment, the first metal layer is further patterned to form a gate scan line and a first connection line, and a gate of the test switch transistor is connected to a signal output terminal of the invalid gate driving unit through the gate scan line. The gate of the test switch transistor is connected to the disable signal terminal through the first connection line, and when the pixel voltage needs to be tested, the first connection line is cut off.

According to one embodiment of the present application, there are more than one second connection line.

In an embodiment, the driving circuit further comprises a test driving transistor, the second metal layer is patterned to form a drain of the test driving transistor, the pixel electrode is connected to the drain of the test driving transistor through a via hole, and the drain of the test driving transistor is connected to the test terminal.

In one embodiment, the second metal layer is further patterned to form a third connection line, and a drain of the test driving transistor is connected to the test terminal through the third connection line.

As shown in FIGS. 7 to 10, according to one embodiment of the present invention, the array substrate 11 comprises:
a substrate 101, wherein the substrate 101 can be a rigid substrate such as a glass substrate or a transparent resin substrate; the substrate 101 can also be a flexible substrate made of, for example, polyimide, polycarbonate, polyethersulfone, polyethylene terephthalate, polyethylene naphthalate, polyarylate or glass fiber reinforced plastic; and the flexible substrate is first formed on a glass substrate by coating, and after production of the display panel is completed, the glass substrate is peeled off by laser;
a buffer layer 102 formed on the substrate 101, wherein the buffer layer 102 can be made of an inorganic material such as silicon oxide or silicon nitride;
an active layer 103 formed on the buffer layer 102, wherein the active layer 103 is metal oxide, such as indium gallium zinc oxide (IGZO), but the present application is not limited in this regard; the active layer 103 can also be made of one or more of aluminum zinc oxide (AZO), indium zinc oxide (IZO), zinc oxide (ZnO), indium oxide (In2O3), boron-doped zinc oxide (BZO), and magnesium-doped zinc oxide (MZO); and besides, the active layer 102 can also be made of polysilicon or other suitable material;
a gate insulating layer 104 formed on the active layer 103, wherein the gate insulating layer 104 can be made of an inorganic material such as silicon oxide or silicon nitride;
a first metal layer 105 formed on the gate insulating layer 104, wherein the first metal layer 105 can be made of molybdenum, aluminum, or copper, but the present application is not limited in this regard; the first metal layer 105 can also be made of chromium, tungsten, titanium, tantalum, or alloy thereof, but the present application is not limited to particular materials herein;
an interlayer insulating layer 106 formed on the first metal layer 105, wherein the interlayer insulating layer 106 can be made of an inorganic material such as silicon oxide or silicon nitride;
a second metal layer 107 formed on the interlayer insulating layer 106, wherein the second metal layer 107 can be made of molybdenum, aluminum, or copper, but the present application is not limited in this regard; the second metal layer 107 can also be made of chromium, tungsten, titanium, tantalum, and alloy thereof, but the present application is not limited to particular materials herein;
a passivation layer 110 formed on the second metal layer 107, wherein the passivation layer 110 can be made of at least one of silicon oxide and silicon nitride; and
a second transparent conductive layer 111 formed on the passivation layer 110, wherein the second transparent conductive layer 111 can be made of conductive glass (ITO).

The first metal layer 105 is patterned to form a gate a, a gate scan line b, and a first connection line c. The second metal layer 107 is patterned to form a data line data, a source g, a drain h, the test terminal 231, a second connection line k, and a third connection line l. The second transparent conductive layer 111 is patterned to form the pixel electrode 232.

Figure 7:
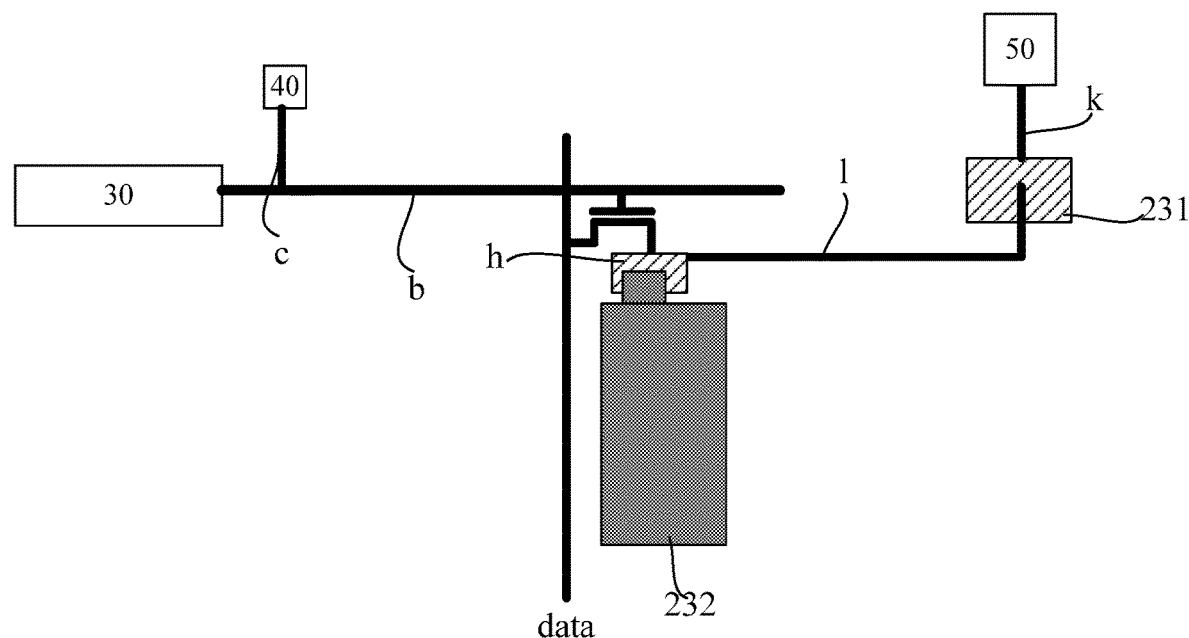
FIG. 7 is a schematic view illustrating that the test pixel is in the off state according to another embodiment of the present application.
Figure 8:
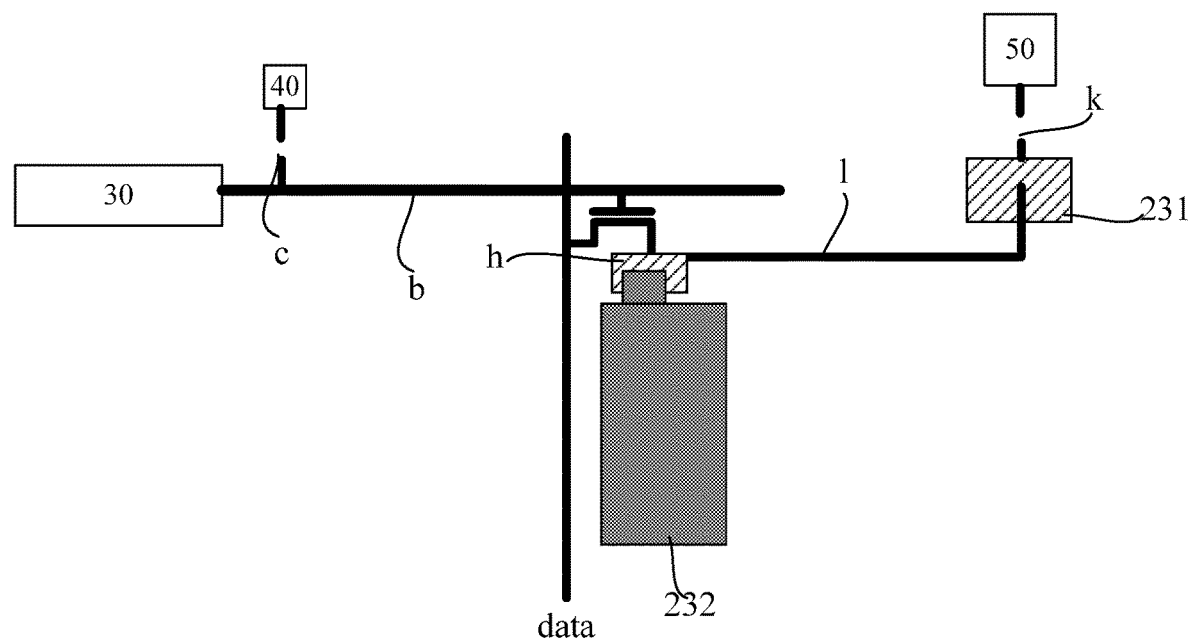
FIG. 8 is a schematic view illustrating that the test pixel is in the on state according to another embodiment of the present application.
Figure 9:
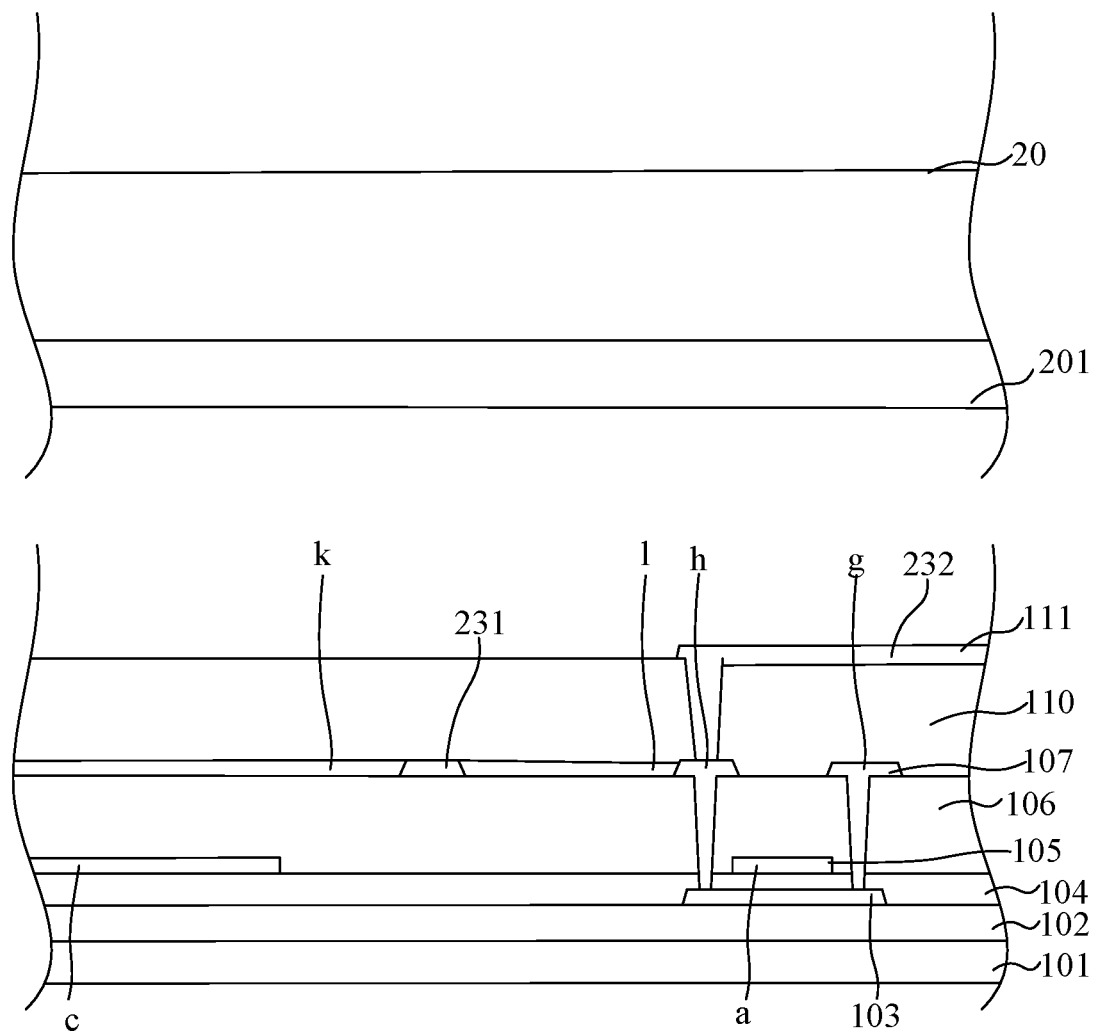
FIG. 9 is a schematic view illustrating the film layers of the liquid crystal display panel according to still another embodiment of the present application.
Figure 10:
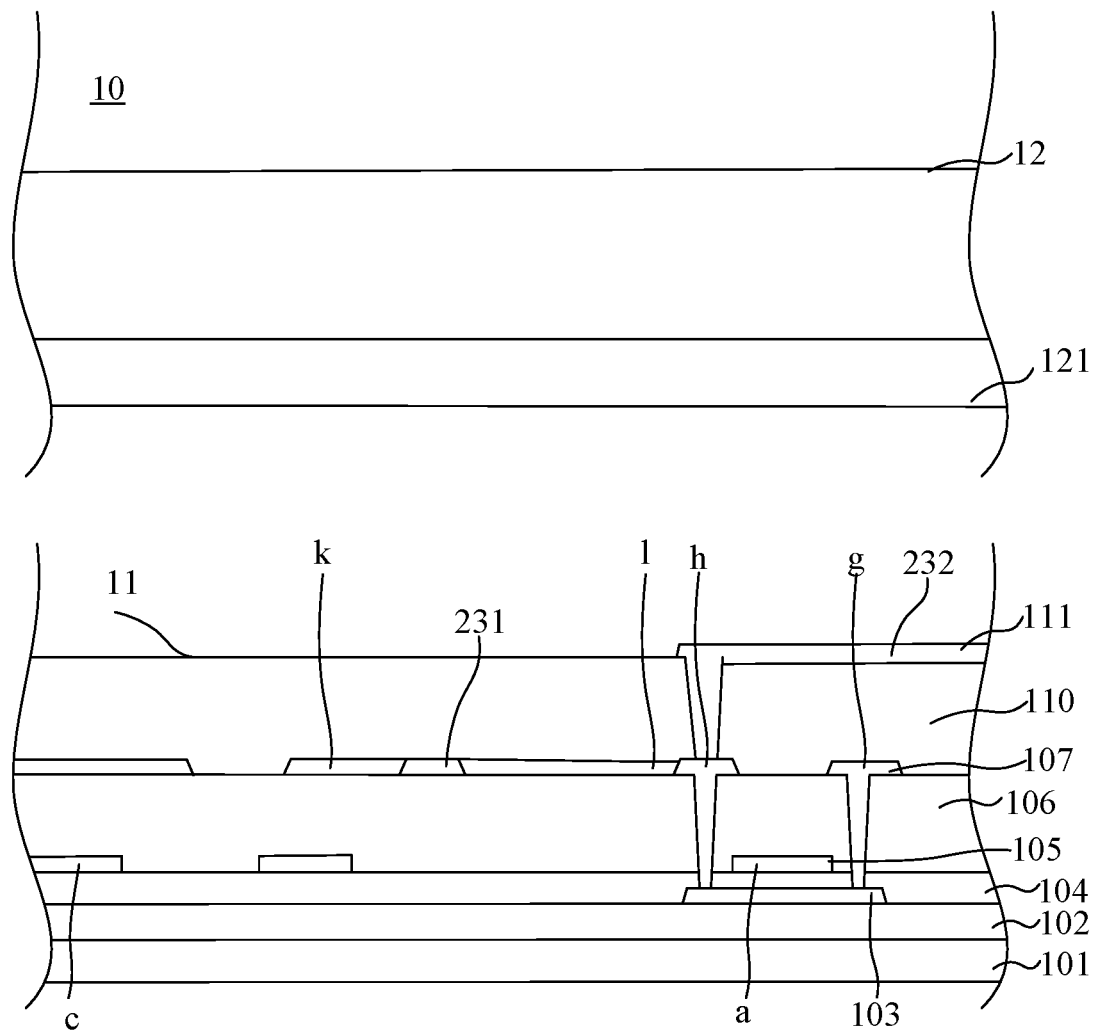
FIG. 10 is a schematic view illustrating the film layers of the liquid crystal display panel according to yet still another embodiment of the present application.

As shown in FIGS. 7 and 9, when the pixel voltage measurement is not performed, the first connection line c and the second connection line k are kept connected. At this time, the transistor 233 is in an off state, and the pixel electrode 232, the test terminal 231, and the common voltage terminal 50 remain connected, and there is no voltage difference between the pixel electrode 232 and the common voltage terminal 50. That is to say, there is no voltage difference between the pixel electrode 232 and the common electrode layer 121 on the color filter substrate 12. As shown in FIG. 8 and FIG. 10, when to measure the pixel voltage, the first connection line c and the second connection line k are cut off by laser or the like. At this time, the transistor 233 is in an on state, the pixel electrode 232 and the test terminal 231 are kept connected to each other, the pixel electrode 232 is charged, and the pixel voltage can be measured through the test terminal 231.

The above description of each film layer takes a bottom-gate thin film transistor as an example. Certainly, the driving circuit layer is not limited to this structure, and a top-gate thin film transistor can be used.

As shown in FIG. 11, the test pixel 23 on the display panel is generally at a position of the invalid pixel 21 at a top portion or a bottom portion of the display panel.

The present application provides a display device, comprising a liquid crystal display panel and an external driving chip bound to the liquid crystal display panel, wherein the liquid crystal display panel comprises an array substrate and a color filter substrate disposed corresponding to each other, and the array substrate comprises:
 a plurality of invalid pixels arranged in an array;
 an invalid gate driving unit disposed corresponding to the invalid pixels;
 a disable signal terminal for outputting a voltage signal of a disable switch transistor; and
 a common voltage terminal for outputting a common voltage;
 wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;
 wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

According to one embodiment, the array substrate comprises:
 a substrate;
 a buffer layer formed on the substrate;
 a first metal layer formed on the buffer layer, wherein the first metal layer is patterned to form the gate of the test switch transistor;
 an interlayer insulating layer formed on the first metal layer;
 a second metal layer formed on the interlayer insulating layer;
 a planarization layer formed on the second metal layer;
 a first transparent conductive layer formed on the planarization layer, wherein the first transparent conductive layer is patterned to form an array substrate common electrode and the test terminal, and the test terminal is electrically insulated from the array substrate common electrode;
 a passivation layer formed on the first transparent conductive layer; and
 a second transparent conductive layer formed on the passivation layer, wherein the second transparent conductive layer is patterned to form the pixel electrode.

According to one embodiment of the present application, the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

According to one embodiment, the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

According to one embodiment of the present application, there is more than one second connection line.

According to one embodiment of the present application, the second metal layer common voltage pattern is connected to the array substrate common electrode through a via hole, and the array substrate common electrode is connected to the common voltage terminal.

According to one embodiment of the present application, the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

According to one embodiment of the present application, the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

According to one embodiment of the present application, the first metal layer test pattern is directly connected to the test terminal through a via hole, or the first metal layer test pattern is connected to the second metal layer test pattern through a via hole.

According to one embodiment of the present application, the first transparent conductive layer is made of conductive glass.

In one embodiment of the present application, the display device can be any product or component having a display function, such as a television, a display panel, a digital photo frame, a mobile phone, and a tablet computer.

According to the above embodiment, it can be known that:

The present application provides a liquid crystal display panel and a display device. The liquid crystal display panel comprises an array substrate and a color filter substrate disposed corresponding to each other, wherein the array substrate comprises:

a plurality of invalid pixels arranged in an array;

an invalid gate driving unit disposed corresponding to the invalid pixels;

a disable signal terminal for outputting a voltage signal of a disable switch transistor; and a common voltage terminal for outputting a common voltage;

wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;

wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

Based on this structure, the test pixel is an invalid pixel, and when the pixel voltage needs not be tested, the test pixel is in an off state, and there is no voltage difference between the pixel electrode and the common electrode to cause rotation of liquid crystals, so normal display functions of the liquid crystal display panel are not affected. Furthermore, when the pixel voltage needs to be tested, the test pixel is in an on state, and the pixel electrode is disconnected from the common electrode to cause a voltage difference, so that the liquid crystals are normally rotated. In addition, the test terminal is arranged in the shielding region for the test pixel, so the pixel voltage is not released to the air, which improves accuracy of pixel voltage measurement in the display region of the liquid crystal display panel.

In summary, although the present application has been disclosed above with preferable embodiments, the above preferable embodiments are not intended to limit the present application. Those skilled in the art can make various modifications without departing from the spirit and scope of the present application. Therefore, the protection scope of the present application shall be defined by the appended claims.

What is claimed is:

1. A liquid crystal display panel, comprising an array substrate and a color filter substrate disposed corresponding to each other, the array substrate comprising:

a plurality of invalid pixels arranged in an array;

an invalid gate driving unit disposed corresponding to the invalid pixels;

a disable signal terminal for outputting a voltage signal of a disable switch transistor; and a common voltage terminal for outputting a common voltage;

wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;

wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

2. The liquid crystal display panel according to claim 1, wherein the array substrate comprises:

a substrate;

a buffer layer formed on the substrate;

a first metal layer formed on the buffer layer, wherein the first metal layer is patterned to form the gate of the test switch transistor;

an interlayer insulating layer formed on the first metal layer;

a second metal layer formed on the interlayer insulating layer;

a planarization layer formed on the second metal layer;

a first transparent conductive layer formed on the planarization layer, wherein the first transparent conductive layer is patterned to form an array substrate common electrode and the test terminal, and the test terminal is electrically insulated from the array substrate common electrode;

a passivation layer formed on the first transparent conductive layer; and a second transparent conductive layer formed on the passivation layer, wherein the second transparent conductive layer is patterned to form the pixel electrode.

3. The liquid crystal display panel according to claim 2, wherein the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

4. The liquid crystal display panel according to claim 3, wherein the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

5. The liquid crystal display panel according to claim 4, wherein the liquid crystal display panel comprises more than one second connection line.

6. The liquid crystal display panel according to claim 4, wherein the second metal layer common voltage pattern is connected to the array substrate common electrode through a via hole, and the array substrate common electrode is connected to the common voltage terminal.

7. The liquid crystal display panel according to claim 4, wherein the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

8. The liquid crystal display panel according to claim 7, wherein the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is also patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

9. The liquid crystal display panel according to claim 8, wherein the first metal layer test pattern is directly connected to the test terminal through a via hole, or the first metal layer test pattern is connected to the second metal layer test pattern through a via hole.

10. The liquid crystal display panel according to claim 2, wherein the first transparent conductive layer is made of conductive glass.

11. A display device, comprising a liquid crystal display panel and an external driving chip bound to the liquid crystal display panel, wherein the liquid crystal display panel comprises an array substrate and a color filter substrate disposed corresponding to each other, and the array substrate comprises:
a plurality of invalid pixels arranged in an array;
an invalid gate driving unit disposed corresponding to the invalid pixels;
a disable signal terminal for outputting a voltage signal of a disable switch transistor; and
a common voltage terminal for outputting a common voltage;
wherein the invalid pixels comprise a test pixel, the test pixel comprises a driving circuit and a test terminal disposed in a shielding region and comprises a pixel electrode in a light-transmissive region, the driving circuit comprises a test switch transistor, and the test terminal is connected to the pixel electrode to be a pixel voltage test point;
wherein a gate of the test switch transistor is connected to a signal output terminal of the invalid gate driving unit and the disable signal terminal, and the test terminal is connected to the common voltage terminal; when a pixel voltage needs not be tested, the invalid gate driving unit outputs no switching signals; when the pixel voltage needs to be tested, the gate of the test switch transistor is disconnected from the disable signal terminal, the test terminal is disconnected from the common voltage terminal, and the invalid gate driving unit outputs a switching signal.

12. The display device according to claim 11, wherein the array substrate comprises:
a substrate;
a buffer layer formed on the substrate;
a first metal layer formed on the buffer layer, wherein the first metal layer is patterned to form the gate of the test switch transistor;
an interlayer insulating layer formed on the first metal layer;
a second metal layer formed on the interlayer insulating layer;
a planarization layer formed on the second metal layer;
a first transparent conductive layer formed on the planarization layer, wherein the first transparent conductive layer is patterned to form an array substrate common electrode and the test terminal, and the test terminal is electrically insulated from the array substrate common electrode;
a passivation layer formed on the first transparent conductive layer; and
a second transparent conductive layer formed on the passivation layer, wherein the second transparent conductive layer is patterned to form the pixel electrode.

13. The display device according to claim 12, wherein the first metal layer is further patterned to form a gate scan line and a first connection line, the gate of the test switch transistor is connected to the signal output terminal of the invalid gate driving unit through the gate scan line, the gate of the test switch transistor is connected to the disable signal terminal through the first connection line, and when the pixel voltage needs to be tested, the first connection line is cut off.

14. The display device according to claim 13, wherein the second metal layer is patterned at a position corresponding to the test terminal to form a second metal layer test pattern, the second metal layer is patterned at a position corresponding to the common voltage terminal to form a second metal layer common voltage pattern, the second metal layer is patterned between the second metal layer test pattern and the second metal layer common voltage pattern to form a second connection line, the test terminal is connected to the second metal layer test pattern through a via hole, the second metal layer test pattern is connected to the second metal layer common voltage pattern through the second connection line, the second metal layer common voltage pattern is connected to the common voltage terminal through a via hole, and when the pixel voltage needs to be tested, the second connection line is cut off.

15. The display device according to claim 14, wherein the display device comprises more than one second connection line.

16. The display device according to claim 14, wherein the second metal layer common voltage pattern is connected to the array substrate common electrode through a via hole, and the array substrate common electrode is connected to the common voltage terminal.

17. The display device according to claim 14, wherein the driving circuit further comprises a test driving transistor, the second metal layer is patterned to form a drain of the test driving transistor, the pixel electrode is connected to the drain of the test driving transistor through a via hole, and the drain of the test driving transistor is connected to the second metal layer test pattern.

18. The display device according to claim 17, wherein the test pixel further comprises a conversion region in the shielding region, the second metal layer is patterned at a position corresponding to the conversion region to form a second metal layer conversion pattern, the first metal layer is patterned at a position corresponding to the conversion region to form a first metal layer conversion pattern, the first metal layer is patterned at a position corresponding to the test terminal to form a first metal layer test pattern, the second metal layer is patterned to form a third connection line, the first metal layer is patterned to form a fourth connection line, the drain of the test driving transistor is connected to the second metal layer conversion pattern through the third connection line, the second metal layer conversion pattern is connected to the first metal layer conversion pattern through a via hole, the first metal layer conversion pattern is connected to the first metal layer test pattern through the fourth connection line, and the first metal layer test pattern is connected to the test terminal.

19. The display device according to claim 18, wherein the first metal layer test pattern is directly connected to the test terminal through a via hole, or the first metal layer test pattern is connected to the second metal layer test pattern through a via hole.

20. The display device according to claim 12, wherein the first transparent conductive layer is made of conductive glass.

* * * * *